United States Patent [19]

Gage

[11] 3,869,139
[45] Mar. 4, 1975

[54] STEERING GEAR MOUNTING
[75] Inventor: Raymond T. Gage, Dearborn Heights, Mich.
[73] Assignee: Ford Motor Company, Dearborn, Mich.
[22] Filed: Dec. 5, 1972
[21] Appl. No.: 312,414

[52] U.S. Cl.................. 280/96, 74/498, 280/96.1
[51] Int. Cl............................................. B62d 1/00
[58] Field of Search............... 280/87 R, 96; 74/498

[56] References Cited
UNITED STATES PATENTS
3,632,127  1/1972  Grosseau ........................ 280/96
FOREIGN PATENTS OR APPLICATIONS
552,300  11/1956  Italy ............................... 280/96
400,101  10/1933  Great Britain .................. 280/96
194,347  4/1962  Sweden ........................... 280/96

Primary Examiner—Robert J. Spar
Assistant Examiner—Ross Weaver
Attorney, Agent, or Firm—Clifford L. Sadler; Keith L. Zerschling

[57] ABSTRACT

This disclosure relates to a vibration isolating device and more particularly to a vibration isolating device that is adapted to secure a steering gear to the chassis frame in an automotive vehicle. In accordance with an embodiment of the invention, an automotive steering gear of the rack and pinion type is connected to a frame cross member by three cylindrical resilient bushings. The bushings each have differing spring rates depending upon the direction of deflection. The greatest resiliency or lowest spring rate is in a direction parallel to the axis of the bushing. Cantilever pins support the bushings on a frame cross member with their axes parallel to the longitudinal axis of the vehicle. By arranging the axes of the bushings longitudinally, the steering gear is permitted to deflect under prevailing loads without unduly stressing the rack and other steering system components.

1 Claim, 3 Drawing Figures

STEERING GEAR MOUNTING

BACKGROUND OF THE DISCLOSURE

It is essential in automotive design that vehicle components which produce vibration and noise be effectively isolated from the passenger compartment and from chassis and body components within the generally area of the vehicle operator and passengers.

The present invention provides a means for isolating vibration and noise between components of an automotive vehicle and is particularly adapted to be employed as a vibration isolating mounting between the steering gear of the vehicle and a frame or structural member thereof. Steering gears are commonly subject to vibrations emanating from road conditions. Shocks and vibrations are transmitted to the steering gear from the steerable road wheels of the vehicle through the steering linkage. In addition, there are audible moises generated in the steering gear due to mechanical phenomenon present during the operation of the gear.

It is, therefore, an object of the present invention to provide a vibration isolating device for connecting a rack and pinion type steering gear to a vehicle frame member. The mounting isolates noise and vibration originating in the steering gear, or transmitted to the steering gear by the steering linkage, from being transmitted from the gear to the vehicle frame. The mounting also permits the gear to deflect with respect to the frame when subjected to loads during the operation of the motor vehicle.

BRIEF SUMMARY OF THE DISCLOSURE

In the presently preferred embodiment of this invention, a rack and pinion type steering gear assembly comprises a tubular housing in which a toothed rack is reciprocably mounted. An input shaft has its rearward end connected to a steering wheel and its forward end connected to a pinion gear situated within the housing. The pinion engages the toothed rack.

The gear assembly is supported by three resilient bushings. Each bushing includes a cylindrical rubber element having an axis that is arranged parallel to the longitudinal axis of the vehicle. The rubber elements are situated within cylindrical eyes attached to the gear housing and are supported on cantilever pins attached to a frame cross member. The resilient bushings have their greatest resiliency or lowest spring rate in a direction parallel to their longitudinal axes.

The rubber elements in the bushings provide an insulating layer of dampening material between the steering gear and the vehicle frame whereby noise associated with the gear is attenuated and not transmitted to the frame. By arranging the axes of the resilient bushings parallel to the longitudinal axis of the vehicle, the steering gear assembly is permitted to deflect under prevailing loads without unduly stressing the rack and other steering system components.

BRIEF DESCRIPTION OF THE DRAWINGS

The many objects and advantages of a steering gear mounting system in accordance with this invention will become apparent upon consideration of the following detailed description and the accompanying drawings, in which.

DETAILED DESCRIPTION OF THE PREFERRED EMBODIMENT

Figure 1:
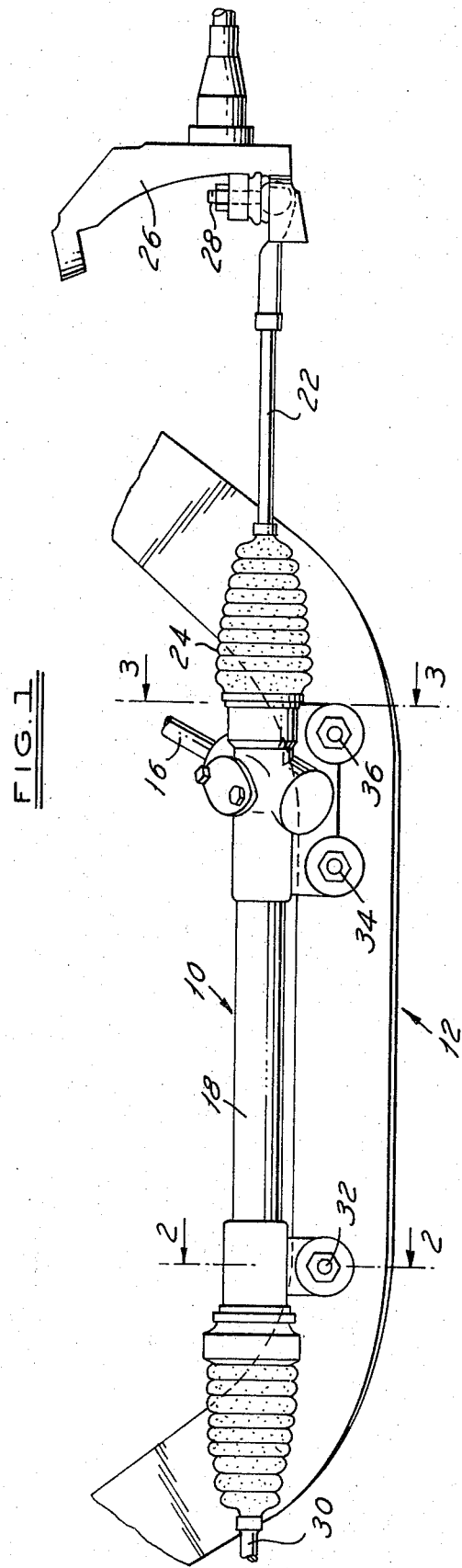
FIG. 1 is a front elevational view of a rack and pinion steering gear secured to a frame cross member in a motor vehicle.

Referring now to the drawings, wherein the presently preferred embodiment of this invention is disclosed, FIG. 1 illustrates a rack and pinion steering gear assembly 10 that is secured to a cross member 12 of a vehicle chassis frame. Resilient mounting means connects the gear 10 to the frame 12 as will be described below.

The rack and pinion steering gear 10 includes a housing portion 14 which rotatably supports a pinion gear. A steering shaft 16 is connected at its forward end to the pinion within the housing 14. The rearward end of the steering shaft 16 is connected to a steering wheel. A tubular housing portion 18 reciprocably supports a toothed rack 20 that has rack teeth in mesh with the teeth of the pinion gear in the housing portion 14.

A left tie rod 22 has its inner end connected to the end of the rack 20. This joint is protected by a rubber boot seal 24. The outer end of the left tie rod 22 is connected to the steering arm of a wheel spindle 26 by means of a ball joint assembly 28.

A right tie rod 30 provides a similar connection between the right end of the toothed rack 20 and the right wheel spindle (not shown).

In accordance with the present invention, resilient means is provided to support the rack and pinion steering gear 10 on the frame cross member 12. The resilient means includes three similarly constructed and arranged resilient bushing assemblies 32, 34 and 36.

Figure 2:
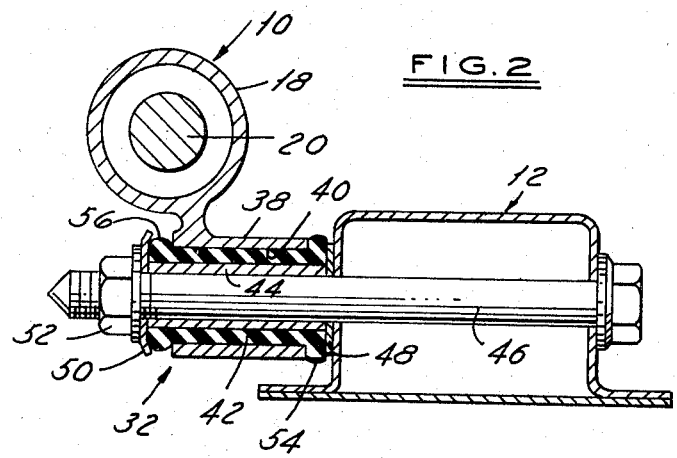
FIG. 2 is a sectional view taken along section line 2—2 of FIG. 1.

Referring to FIG. 2, the tubular housing 18 of the gear 10 has a depending bracket 38 with a cylindrical interior surface 40. A cylindrical rubber element 42 is situated within the cylindrical opening 40 of the bracket 38. The resilient bushing element 42 is bonded to a metal sleeve 44.

The frame cross member 12 has a generally box shape in cross section as seen in FIG. 2. A bolt 46 extends through the side walls of the frame member 12 and through the sleeve 42. An inner washer 48 is interposed between one end of the bushing 44 and the frame member 12. A second or outer washer 50 is situated about the bolt 46 adjacent the outer end of the sleeve 44 and resilient element 42. A nut 52 is threaded tightly on the end of the bolt 46 to secure the bushing assembly 32 to the frame 12.

It is to be noted that the rubber element 42 has a radially flange portion 54 at its inner end which is disposed between the inner washer 48 and the end of the annular bracket 38. The outer end of the resilient element 42 has a radial flange 56 situated between the washer 50 and the forward end of the annular bracket 38.

Figure 3:
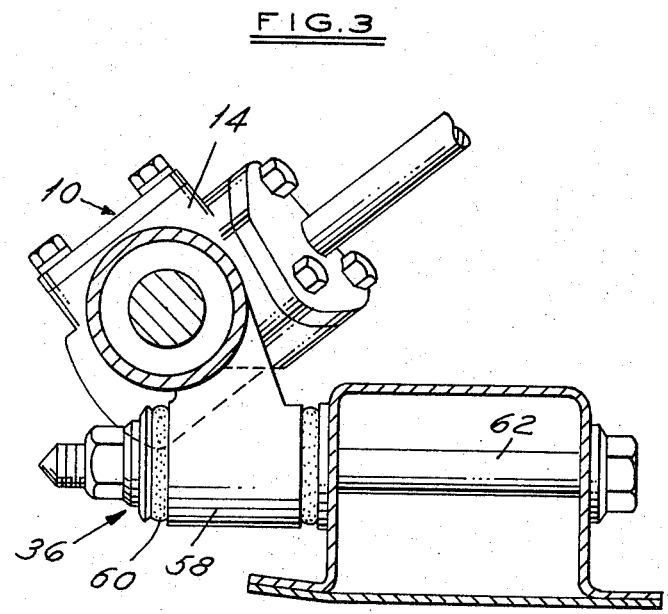
FIG. 3 is a sectional view taken along section line 3—3 of FIG. 1.

The bushing assemblies 34 and 36 which connect the gear housing portion 14 to the frame 12 are constructed similarly to the bushing assembly 32 of FIG. 2. In FIG. 3, the housing portion 14 has an annular depending bracket 58 in which an annular rubber element 60 is situated. The rubber element 60 contains a metal sleeve (not shown) which is supported by a bolt 62. A nut 64 secures the bushing assembly 36 on the bolt 62.

OPERATION

Each of the resilient bushings 32, 34 and 36 has directional properties, that is, each has greater resiliency (lower spring rate) with respect to deflection that is parallel to its longitudinal axis than for displacement in a radial direction. This results, in part, from the presence of the inner sleeve 44 which operates to limit the compression of the rubber 42 when the nut 52 is tightened.

The axes of the resilient bushing assemblies 32, 34 and 36 are aranged parallel to the longitudinal axis of the motor vehicle. The principal loads upon rack and pinion steering gear 10 during the operation of the vehicle are parallel to the same longitudinal axis. The steering gear 10, therefore, will be permitted to accommodate the loads without unduly stressing the rack 20 and other steering gear components.

The steering gear and mounting system of this invention is particularly characterized by its simplicity of construction and superior performance. The mounting system effectively cushions prevailing loads upon the gear assembly 10. The steering gear 10 is isolated from the frame 12 by resilient elements whereby noise and vibration will be attenuated and not transmitted to the frame. The arrangement of the mounting bolts and the bushings greatly simplifies the assembly of the vehicle and facilitates the connecting of the steering gear 10 to the frame 12.

The foregoing description presents the presently preferred embodiment of this invention. Modifications and alterations may occur to those skilled in the art that will come within the scope and spirit of the following claims.

I claim:

1. A rack and pinion steering gear for a motor vehicle and mounting means connecting said gear to a transverse vehicle frame component,
   said rack and pinion steering gear having a housing containing a laterally displaceable rack,
   said housing being arranged generally perpendicular in the plan view to the longitudinal axis of said vehicle,
   said housing having a plurality of longitudinally oriented tubular mounting eyes,
   a single cylindrical resilient element disposed in each of said eyes,
   each of said resilient elements being of greater length then its respective eye and having fore and aft end portions that extend beyond the fore and aft ends of said eye,
   a rigid sleeve disposed with in the center of each of said resilient elements,
   each of said sleeves being of greater axial length than its respective eye and of lesser axial length than its respective cylindrical element when said element is in its unstressed state,
   fore and aft thrust washers positioned at the ends of said resilient element and in butting engagement therewith,
   a longitudinally oriented bolt extending through each of said sleeves and through each of said thrust washers exerting a longitudinally directed compressive load on each of said cylindrical resilient elements,
   said end portions of each of said cylindrical resilient elements being formed into radial flanges at said fore and aft ends of its respective eye,
   said sleeves being constructed to limit the compressive load exerted on said resilient elements by said bolts,
   said mounting means being constructed to provide a lower spring rate to deflection of said rack and pinion steering gear in a longitudinal direction than to deflection of said steering gear in a direction perpendicular to the axis of said bolts,
   said mounting means being constructed to substantially prevent pivotal displacement of said steering gear about a longitudinally extending pivot axis.

* * * * *